(12) United States Patent
Jang et al.

(10) Patent No.: US 9,929,599 B2
(45) Date of Patent: Mar. 27, 2018

(54) SHEET FOR SHIELDING AGAINST ELECTROMAGNETIC WAVES AND WIRELESS POWER CHARGING DEVICE

(71) Applicant: Samsung Electro-Mechanics Co., Ltd., Suwon-si (KR)

(72) Inventors: Jae Hyuk Jang, Suwon-si (KR); Hyun Jung Lee, Suwon-si (KR); Yeong Hwan Song, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/185,249

(22) Filed: Jun. 17, 2016

(65) Prior Publication Data

US 2016/0372975 A1    Dec. 22, 2016

(30) Foreign Application Priority Data

Jun. 18, 2015  (KR) ................. 10-2015-0086717
Sep. 4, 2015   (KR) ................. 10-2015-0125429

(51) Int. Cl.

| | |
|---|---|
| *H01F 27/28* | (2006.01) |
| *H02J 50/10* | (2016.01) |
| *H01F 38/14* | (2006.01) |
| *H02J 7/02* | (2016.01) |
| *B05D 1/02* | (2006.01) |
| *B05D 1/18* | (2006.01) |
| *H01F 27/36* | (2006.01) |

(52) U.S. Cl.
CPC .............. *H02J 50/10* (2016.02); *B05D 1/02* (2013.01); *B05D 1/18* (2013.01); *H01F 27/2885* (2013.01); *H01F 27/365* (2013.01); *H01F 38/14* (2013.01); *H02J 7/025* (2013.01)

(58) Field of Classification Search
None
See application file for complete search history.

(56) References Cited

U.S. PATENT DOCUMENTS

| | | | | |
|---|---|---|---|---|
| 6,037,400 | A * | 3/2000 | Kitahata | C08K 3/04 524/495 |
| 6,136,429 | A * | 10/2000 | Saito | H05K 9/0015 428/212 |
| 8,864,748 | B2 * | 10/2014 | Coulthard | A61M 1/0088 602/42 |
| 9,252,611 | B2 * | 2/2016 | Lee | H01F 38/14 |
| 9,392,735 | B2 * | 7/2016 | Jang | B32B 27/08 |
| 9,507,390 | B2 * | 11/2016 | Jang | H05K 9/0075 |

(Continued)

FOREIGN PATENT DOCUMENTS

| | | |
|---|---|---|
| JP | 2001-15656 A | 1/2001 |
| KR | 10-0874689 B1 | 12/2008 |

(Continued)

OTHER PUBLICATIONS

Derwent Abstract of WO 2014/137151 A1 (pub Sep. 12, 2014).*

(Continued)

*Primary Examiner* — Kevin M Bernatz
(74) *Attorney, Agent, or Firm* — NSIP Law

(57) ABSTRACT

A sheet is provided to shield against electromagnetic waves. The sheet includes a magnetic layer, and a heat radiation coating layer coating at least a portion of a surface of the magnetic layer.

18 Claims, 3 Drawing Sheets

(56) References Cited

U.S. PATENT DOCUMENTS

| | | | |
|---|---|---|---|
| 2005/0062024 A1* | 3/2005 | Bessette | B82Y 30/00 |
| | | | 252/500 |
| 2006/0047053 A1* | 3/2006 | Pawlenko | B82Y 30/00 |
| | | | 524/495 |
| 2007/0031995 A1* | 2/2007 | Kaneko | H01L 24/12 |
| | | | 438/119 |
| 2008/0085426 A1* | 4/2008 | Kurita | G11B 5/66 |
| | | | 428/828.1 |
| 2009/0059489 A1* | 3/2009 | Yoo | H05K 9/0096 |
| | | | 361/679.21 |
| 2009/0096996 A1* | 4/2009 | Kim | G03B 21/16 |
| | | | 353/52 |
| 2011/0186324 A1* | 8/2011 | Hur | H05K 9/0098 |
| | | | 174/34 |
| 2012/0057322 A1* | 3/2012 | Waffenschmidt | H01F 27/365 |
| | | | 361/816 |
| 2012/0061135 A1* | 3/2012 | Hill | H05K 9/009 |
| | | | 174/388 |
| 2013/0114165 A1* | 5/2013 | Mosendz | G11B 5/65 |
| | | | 360/244 |
| 2013/0240261 A1* | 9/2013 | Song | H05K 9/0075 |
| | | | 174/391 |
| 2014/0070763 A1* | 3/2014 | Chiles | H01F 38/14 |
| | | | 320/108 |
| 2014/0167522 A1* | 6/2014 | Lee | H01F 38/14 |
| | | | 307/104 |
| 2014/0216807 A1* | 8/2014 | Liu | H05K 9/0088 |
| | | | 174/358 |
| 2014/0306653 A1* | 10/2014 | Hirobe | H01F 38/14 |
| | | | 320/108 |
| 2015/0043162 A1* | 2/2015 | Chen | H01L 23/3675 |
| | | | 361/679.55 |
| 2015/0123860 A1* | 5/2015 | Park | H01Q 1/22 |
| | | | 343/720 |
| 2015/0351217 A1* | 12/2015 | Koukami | H05K 7/20463 |
| | | | 361/707 |
| 2016/0057900 A1* | 2/2016 | Polak | H01F 27/365 |
| | | | 320/108 |
| 2016/0064814 A1* | 3/2016 | Jang | H01Q 1/526 |
| | | | 343/842 |
| 2017/0040830 A1* | 2/2017 | Jang | H02J 7/025 |
| 2017/0053737 A1* | 2/2017 | Kurs | H03H 7/40 |
| 2017/0075396 A1* | 3/2017 | Damaraju | G06F 1/203 |
| 2017/0090532 A1* | 3/2017 | Koukami | G06F 1/20 |
| 2017/0104358 A1* | 4/2017 | Song | H02J 7/025 |
| 2017/0112026 A1* | 4/2017 | Yu | H05K 9/0081 |

FOREIGN PATENT DOCUMENTS

| | | |
|---|---|---|
| KR | 10-1337959 B1 | 12/2013 |
| KR | 10-2015-0050541 A | 5/2015 |
| KR | 2015/0123860 A1 | 5/2015 |

OTHER PUBLICATIONS

Korean Office Action dated Sep. 13, 2016 in counterpart Korean Application No. 10-2015-0125429 (11 pages in English; 7 pages in Korean).

* cited by examiner

SHEET FOR SHIELDING AGAINST ELECTROMAGNETIC WAVES AND WIRELESS POWER CHARGING DEVICE

CROSS-REFERENCE TO RELATED APPLICATIONS

This application claims benefit under 35 USC 119(a) to Korean Patent Application Nos. 10-2015-0086717 and 10-2015-0125429, filed on Jun. 18, 2015 and Sep. 4, 2015, respectively, in the Korean Intellectual Property Office, the disclosures of which are incorporated herein by reference in their entirety.

BACKGROUND

1. Field

The following description relates to a sheet for shielding against electromagnetic waves and a wireless power charging device.

2. Description of Related Art

As weights of various electronic apparatuses are decreased due to miniaturization and lightness of the electronic apparatuses, a non-contact charging method or wireless charging method that charges a battery using magnetic coupling without electrical contact has been developed.

The wireless charging method, which is a method to charge a battery using electromagnetic induction, is a method that charges a battery by converting current generated by inductive coupling between a primary coil (a transmitter coil) provided in a charger (a wireless power transmission device) and a secondary coil (a receiver coil) provided in an object to be charged (a wireless power reception device) into energy.

In this case, a sheet to shield against electromagnetic waves may be disposed between the receiver coil and the battery. The sheet for shielding against electromagnetic waves serves to block a magnetic field generated at the receiver coil from reaching the battery and to efficiently transmit electromagnetic waves generated from the wireless power transmission device to the wireless power reception device.

In a case of wireless charging using the sheet to shield against electromagnetic waves as described above, while power of several to several tens of watts continuously moves, loss of a material and a circuit may occur, and thus a large amount of heat may be generated. Therefore, research into a method of effectively discharging heat generated in the sheet for shielding against electromagnetic waves or the surroundings thereof has been actively conducted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with one embodiment, a sheet is described to shield against electromagnetic waves of which heat radiation performance is improved, and a wireless power charging device.

In accordance with an embodiment, there is provided a sheet to shield against electromagnetic waves, including: a magnetic layer; and a heat radiation coating layer coating at least a portion of a surface of the magnetic layer.

The heat radiation coating layer may be formed to cover an upper surface of the magnetic layer.

The heat radiation coating layer may be formed to cover upper and side surfaces of the magnetic layer.

The heat radiation coating layer may include graphene.

The magnetic layer may include magnetic layers stacked in a thickness direction.

An adhesive layer may be interposed between the magnetic layers.

The heat radiation coating layer may be formed to cover an upper surface of an uppermost magnetic layer among the magnetic layers.

The heat radiation coating layer may be formed to cover side surfaces of the magnetic layers.

The heat radiation coating layer may be directly formed on the surface of the magnetic layer.

In accordance with an embodiment, there is provided a wireless power charging device, including: a coil part; and a sheet configured to shield against electromagnetic waves disposed on the coil part and including a magnetic layer and a heat radiation coating layer coating at least a portion of a surface of the magnetic layer.

The heat radiation coating layer may be formed to cover an upper surface of the magnetic layer.

The heat radiation coating layer may be formed to cover upper and side surfaces of the magnetic layer.

The heat radiation coating layer may extend to an upper surface of the coil part.

The heat radiation coating layer may be directly formed on the upper surface of the coil part.

The heat radiation coating layer may include graphene.

The heat radiation coating layer may be directly formed on the surface of the magnetic layer.

In accordance with another embodiment, there is provided a sheet configured to shield a battery against electromagnetic waves, including: a magnetic layer configured to generate heat and formed as one of an integral layer and crushed into multiple pieces; and a heat radiation coating layer configured to radiate the heat from the magnetic layer and directly cover a portion of or an entire upper surface of the magnetic layer, wherein the heat radiation coating layer extends to side surfaces of the magnetic layer.

The magnetic layer may include magnetic layers and the heat radiation coating layer may be formed to cover an upper surface of an uppermost magnetic layer of the magnetic layers and side surfaces of the magnetic layers.

An adhesive layer may be interposed between the magnetic layers to adhere between the magnetic layers and to interlayer insulation between the magnetic layers.

The heat radiation coating layer covers at least the portion of or the entire upper surface of the magnetic layer may be thicker than a portion of the heat radiation coating layer covering the side surfaces of the magnetic layer.

The heat radiation coating layer covers at least the portion of or the entire upper surface of the magnetic layer may be thinner than a portion of the heat radiation coating layer covering the side surfaces of the magnetic layer.

Other features and aspects will be apparent from the following detailed description, the drawings, and the claims.

Figure 1:
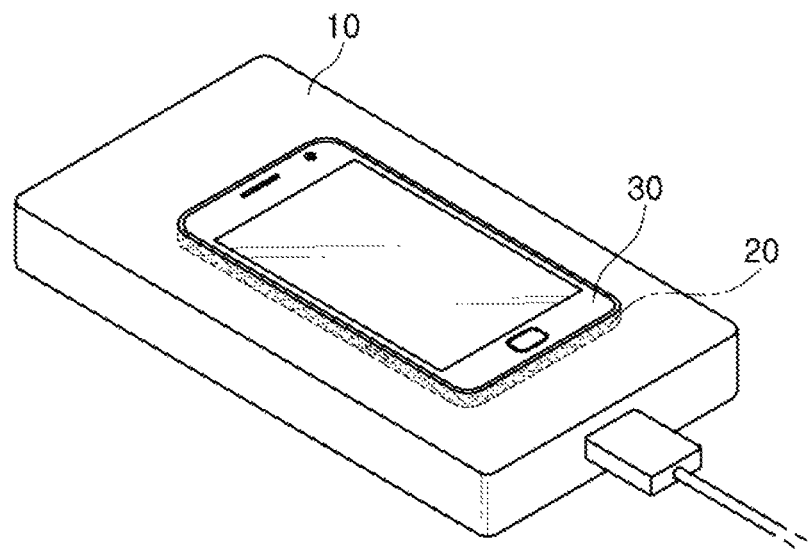
FIG. 1 is a perspective view illustrating an exterior of a general wireless power charging system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Figure 2:
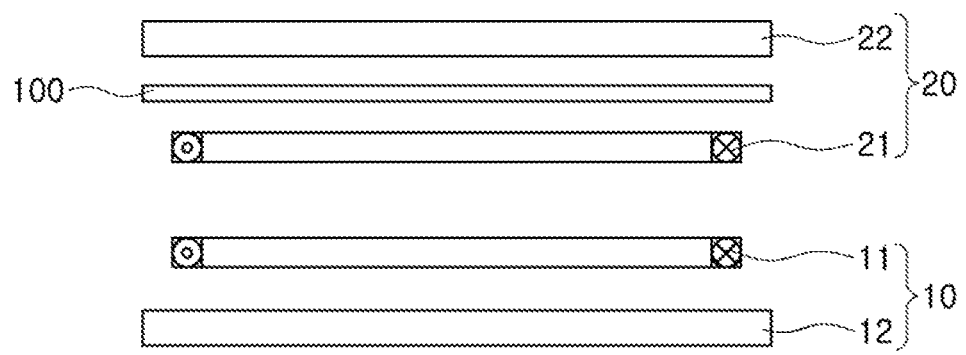
FIG. 2 is an exploded cross-sectional view illustrating main internal configurations of FIG. 1.

FIG. 1 is a perspective view schematically illustrating an exterior of a general wireless power charging system, and FIG. 2 is an exploded cross-sectional view illustrating main internal configurations of FIG. 1.

Referring to FIGS. 1 and 2, the general wireless power charging system includes a wireless power transmission device 10 and a wireless power reception device 20. The wireless power reception device 20 is located within an electronic apparatus 30 such as a portable phone, a laptop PC, a tablet PC, or the like.

As shown in FIG. 2, an interior of the wireless power transmission device 10, a transmitter coil 11 is formed on a substrate 12, and; thus, when an alternating current voltage is applied to the wireless power transmission device 10, a magnetic field is formed therearound. Therefore, electromotive force is induced from the transmitter coil 11 to a receiver coil 21 embedded in the wireless power reception device 20 to charge a battery 22.

In accordance with an embodiment, the battery 22 may be a rechargeable nickel hydrogen battery or lithium ion battery, but it is not particularly limited thereto. Further, the battery 22 may be configured separately from the wireless power reception device 20 and detachable from the wireless power reception device 20. Alternatively, the battery 22 and the wireless power reception device 20 may be integral structural devices.

The transmitter coil 11 and the receiver coil 21 are electromagnetically coupled to each other and formed by winding a metal wire such as a copper wire, or other conductive wire. In an embodiment, the metal wire may be wound in a circular shape, an oval shape, a tetragonal shape, a trapezoidal shape, or other shape, and an entire size or turns of the metal wire may be suitably controlled and configured depending on desired performance, transmission, or work/functional characteristics.

A sheet 100 to shield against electromagnetic waves is disposed between the receiver coil 21 and the battery 22. In one embodiment, the sheet 100 to shield the battery 22 against electromagnetic waves is positioned between the receiver coil 21 and the battery 22. The sheet 100 collects magnetic flux to allow magnetic flux to be received in the receiver coil 21. In an embodiment, the sheet 100 to shield against electromagnetic waves serves to block at least a portion of the magnetic flux from reaching the battery 22.

The sheet 100 to shield against electromagnetic waves, as described above, is coupled to a coil part of a receiver of the wireless power charging device, such as the wireless power reception device 20, as described above. Further, the coil part may also be used in magnetic secure transmission (MST), near field communications (NFC), in addition to a wireless power charging device. In addition, the sheet 100 to shield the battery 22 against electromagnetic waves may also be included in a transmitter, such as the wireless transmission device 10, rather than the receiver of the wireless power charging device. Hereinafter, both the receiver coil 21 and the transmitter coil 11 will be referred to as the coil part. Also, the sheet 100 to shield the battery 22 against electromagnetic waves will be described in more detail.

Figure 3:
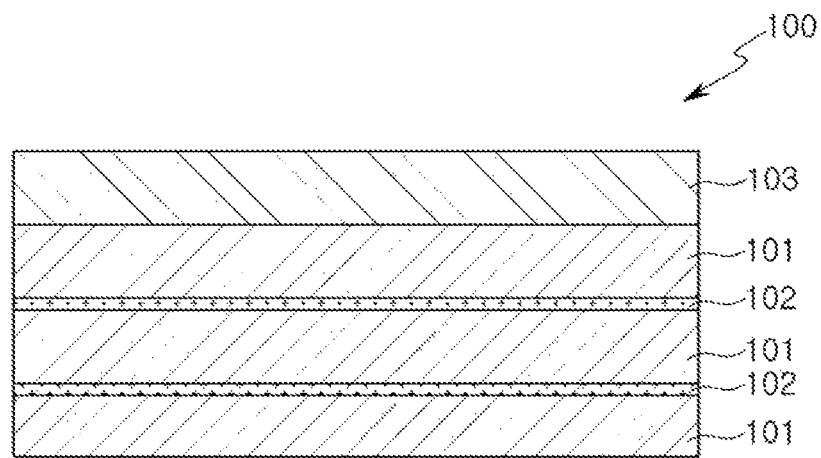
FIG. 3 is a cross-sectional view schematically illustrating a sheet to shield against electromagnetic waves, according to an embodiment.

FIG. 3 is a cross-sectional view schematically illustrating a sheet to shield a battery against electromagnetic waves, according to an embodiment. As illustrated in FIG. 3, the sheet 100 to shield the battery against electromagnetic waves includes a magnetic layer 101 and a heat radiation coating layer 103 coating the magnetic layer 101. In this case, although the embodiment is described based on a structure in which a plurality of magnetic layers 101 are provided and stacked in a thickness direction, the number of stacked magnetic layers 101 may be suitably adjusted depending on a desired shielding function, a size of an electronic apparatus, or other structural and functional specifications. Furthermore, although the heat radiation coating layer 103 is shown in FIG. 3 as coating one of the magnetic layers 101, additional heat radiation coating layers 103 may be provided corresponding to the number of magnetic layers 101 and covering at least one side of the magnetic layer 101. Also, although a continuous heat radiation coating layer 103 is shown coating the magnetic layer 101, at least a portion of the magnetic layer 101 may be coated by the heat radiation coating layer 103.

As the magnetic layer 101 to collect and shield the battery against electromagnetic waves, a thin plate metal ribbon formed of an amorphous alloy, a nano-crystalline alloy, or other alloy, may be used. In an embodiment, as the amorphous alloy, an Fe-based or Co-based magnetic alloy may be used. As the Fe-based magnetic alloy, a material containing Si, for example, an Fe—Si—B alloy may be used, and as a content of metals including Fe is increased, a saturation magnetic flux density is also increased. In an example in which a content of Fe is excessively high, it may be difficult to form the amorphous alloy. Therefore, the content of Fe may be 70 to 90 atomic %, and in view of amorphous forming ability, in one embodiment, a sum of contents of Si and B be in a range of 10 to 30 atomic %. An anti-corrosive element such as chromium (Cr) or cobalt (Co), may be added to a basic composition as described above within a range of 20 atomic % in order to prevent corrosion, and if necessary, a small amount of another metal element may be contained in order to further impart other characteristics.

Next, in a case of using the nano-crystalline alloy, for example, an Fe based nano-crystalline magnetic alloy may be used. As an Fe-based nano-crystalline alloy, a Fe—Si—B—Cu—Nb alloy may be used.

In an embodiment, the magnetic layer 101 is integrally formed. In an alternative embodiment, the magnetic layer 101 includes a structure that is crushed into a plurality of pieces. In a crushed structure, as described above, an electrical insulating property may be provided between the pieces of the magnetic layer 101. Also, the crushed structure may contribute to decreasing an eddy current that may occur in the magnetic layer 101.

An adhesive layer 102 is interposed between the plurality of magnetic layers 101. The adhesive layer 102 is provided to interlayer adhere between the magnetic layers 101 in addition to interlayer insulation between the magnetic layers 101. As the adhesive layer 102, any adhesive layer may be adopted as long as it is suitable to adhere to the magnetic layer 101, for example, a double-sided tape may be used.

The heat radiation coating layer 103 is provided in order to efficiently radiate heat generated in the magnetic layer 101, and is formed to cover a portion of or an entire upper surface of the magnetic layer 101, as illustrated in FIG. 3. In a case of the structure in which a plurality of magnetic layers 101 are stacked as in the illustrated embodiment, the heat radiation coating layer 103 is formed to cover an upper surface of an uppermost magnetic layer among the plurality of magnetic layers 101.

In an embodiment, the heat radiation coating layer 103 is directly formed on a surface of the magnetic layer 101, and as a result, an excellent heat radiation effect may be obtained due to a direct coating structure as described above. That is, the heat radiation coating layer 103 may be directly formed on the surface of the magnetic layer 101 without an adhesive layer. Further, in an embodiment, the heat radiation coating layer 103 may contain a material having excellent heat conductivity while being suitable to the sheet 100 to shield against electromagnetic waves, and as the material as described above, graphene may be used.

In an embodiment, the graphene contained in the heat radiation coating layer 103 may be a new material having a two-dimensional structure in which carbon atoms form a single layer, while forming sp2 hybrid bonds in a honeycomb shape. Graphene, which is a structurally and chemically stable excellent conductor, may allow electrons to move at a speed of about 100 times that of silicon and allow a current to flow at an amount of about 100 times that of copper. In addition, the graphene has mechanical strength of about 200 times that of steel and flexibility, and has optical properties of transmitting 97.7% of incident light, while having heat conductivity of about 5,300 W/m·K. Further, because the graphene is formed of only carbon, the graphene has a high specific surface area of 2,600 m$^2$/g.

As a method of forming a coating layer on the surface of the magnetic layer 101 using graphene powder, various methods, such as a spin coating method, a spray coating method, a vacuum filtering method, a Langmuir-Blodgett assembly method, a layer-by-layer (LBL) assembly method, a dipping method, a roll coating method, or a comma coating method may be used. In embodiments using these methods, the graphene powder may be coated in a structure in which the graphene powder is mixed with an organic or inorganic binder on the stacking structure. Hereinafter, some of the methods described above will be described.

The spin coating method is a method of dropping a constant amount of graphene oxide solution on a substrate and rotating the substrate, that is, a coating target (the magnetic layer in an embodiment) at a high speed to coat the substrate using centrifugal force applied to the solution.

The spray coating method is a coating method of spraying a graphene oxide solution on a substrate. In this method, it may be easy to coat a large-area substrate, and the method itself may be rapid and simple, but graphene oxide particles may be aggregated before the solution sprayed from a nozzle does not reach the substrate, and; thus, an entire area of a film may not be uniform.

The vacuum filtering method is a coating method of filtering a graphene oxide solution using a micro-filtering paper to allow the graphene oxide particles filtered through the micro-filtering paper to form a film. In this method, a uniformly coated film may be obtained, and it may be easy to control a thickness of the film. However, the graphene oxide solution may be excessively consumed, and a time period required for coating may be relatively long.

The Langmuir-Blodgett assembly method is a coating method of vertically immersing a substrate in a solution of which graphene oxides are arranged on a surface, and slowly lifting the substrate at a constant speed so that the graphene oxide particles are self-assembled on the substrate. In the Langmuir-Blodgett assembly method, a relatively uniform film may be obtained, but a time period required for coating may be long, and it may be difficult to coat a large-area substrate.

The layer-by-layer (LBL) assembly method is a coating method of imparting different surface charges on graphene particles and assembling a film using electrostatic attractive force. In the LBL assembly method, layers of the graphene oxide particles are stacked one by one by attaching functional groups to the graphene particles to prepare a graphene oxide solution having a positive charge and a graphene oxide solution having a negative charge, respectively, and alternately immersing a substrate in two solutions. The LBL assembly method may have excellent operability, but a pre-treatment process of attaching the functional groups to the graphene particles is required, amounts of the graphene oxide solutions consumed in the process may be large, and a time period required for the process may be long.

In accordance with an embodiment, the heat radiation coating layer 103 may be formed using any of the methods described above, or methods mentioned above because a physical adhesive layer such as a double-sided tape is not required to couple the heat radiation coating layer 103 to the magnetic layer 101. As a result, thicknesses of the sheet 100 to shield against electromagnetic waves and a device using the same is decreased, which is advantageous to miniaturize the electronic apparatus using the same.

Figure 4:
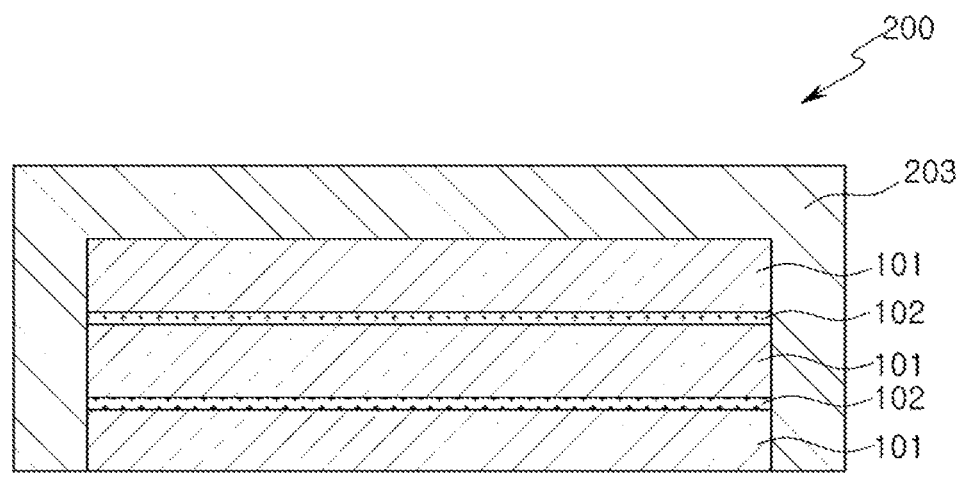
FIG. 4 is a cross-sectional view schematically illustrating a sheet for shielding against electromagnetic waves, according to another embodiment.

Another embodiment will be described with reference to FIGS. 4 and 5. A sheet 200 to shield a battery against electromagnetic waves illustrated in FIG. 4 has a structure including a plurality of magnetic layers 101, an adhesive layer 102, and a heat radiation coating layer 203, as in the embodiment described above, and only a shape of the heat radiation coating layer 203 may be different from that in the embodiment described above. Here, FIG. 5 illustrates a form in which the sheet 200 to shield the battery against electromagnetic waves illustrated in FIG. 4 is disposed on and coupled to a coil part.

In an embodiment, the heat radiation coating layer 203 is formed to cover upper and side surfaces of the magnetic layer 101. In an embodiment of the structure in which a plurality of magnetic layers 101 are stacked, the heat radiation coating layer 203 is formed to cover an upper surface of an uppermost magnetic layer of the plurality of magnetic layers 101 and side surfaces of the plurality of magnetic layers 101. The heat radiation coating layer 203 is different only in the shape from that in the embodiment described above, but may be directly formed on a surface of the magnetic layer 101 without an adhesive (adhesive layer 102), as in the embodiment described above.

A coating area of the heat radiation coating layer 203 is extended to the side surfaces of the magnetic layer 101 in an embodiment, and thus exposed side surfaces of the magnetic layer 101 may be effectively protected. That is, in addition to a heat radiation effect, separation of a magnetic material may be prevented, and the magnetic layer 101 may be protected from moisture, temperature, or other external factors, by coating the side surfaces of the stacked magnetic layers 101. In one embodiment, a portion of the heat radiation coating layer 203 that is covering the upper surface of the uppermost magnetic layer of the plurality of magnetic layers 101 is thicker than a portion of the heat radiation coating layer 203 covering the side surfaces of the plurality of magnetic layers 101. In an alternative embodiment, the portion of the heat radiation coating layer 203 that is covering the upper surface of the uppermost magnetic layer of the plurality of magnetic layers 101 is thinner than a portion of the heat radiation coating layer 203 covering the side surfaces of the plurality of magnetic layers.

Figure 5:
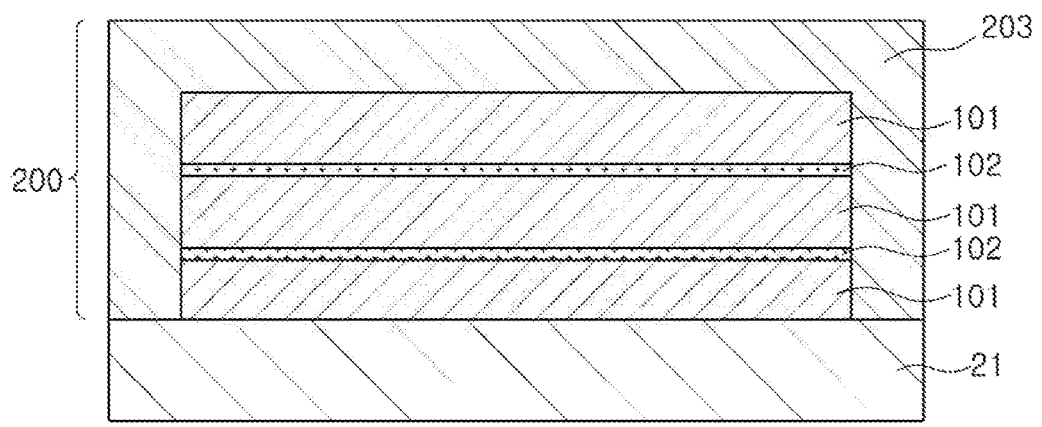
FIG. 5 is a cross-sectional view schematically illustrating a form in which a sheet for shielding against electromagnetic waves and a coil part are coupled to each other in a wireless power charging system, according to an embodiment.

Further, as illustrated in FIG. 5, the heat radiation coating layer 203 may be extended to one surface of the coil part 21, that is, an upper surface of the coil part 21, in an embodiment. In this case, the heat radiation coating layer 203 may be directly formed on one surface of the coil part 201 without an adhesive, or the like. As the heat radiation coating layer 203 is formed to contact the coil part 21, heat radiated from the coil part 21 as well as the magnetic layer 101 may be effectively radiated, and this heat radiation effect may be further be improved by directly forming the heat radiation coating layer 203 on the surface of the coil part 21.

As set forth above, according to various embodiments, heat radiation performance of the sheet to shield against electromagnetic waves and the wireless power charging device may be significantly improved due to the heat radiation coating layer applied to the surface of the magnetic layer, which is advantageous, at least, to improve reliability of an electronic apparatus using the same.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sheet to shield against electromagnetic waves, comprising:
   a magnetic layer; and
   a heat radiation coating layer coating an upper surface and side surfaces of the magnetic layer, wherein side surfaces of the heat radiation coating layer extend perpendicularly along the side surfaces of the magnetic layer from the upper surface to a bottom of the magnetic layer, and side surfaces of the heat radiation coating layer and the bottom of the magnetic layer directly contact a coil part.

2. The sheet of claim 1, wherein the heat radiation coating layer comprises graphene.

3. The sheet of claim 1, wherein the magnetic layer comprises magnetic layers stacked in a thickness direction.

4. The sheet of claim 3, wherein an adhesive layer is interposed between the magnetic layers.

5. The sheet of claim 1, wherein the heat radiation coating layer is directly formed on the surface of the magnetic layer.

6. The sheet of claim 1, wherein the magnetic alloy comprises a nano-crystalline Fe—Si—B—Cu—Nb alloy.

7. The sheet of claim 1, wherein the heat radiation coating layer does not cover a bottom surface of the magnetic layer.

8. The sheet of claim 1, wherein a number of magnetic layers is 3, the number of the adhesive layers is 2, and a number of heat radiation coating layers is 1.

9. A wireless power charging device, comprising:
   a coil part; and
   a sheet configured to shield against electromagnetic waves disposed on the coil part and comprising a magnetic layer comprising crushed pieces and a heat radiation coating layer coating an upper surface and side surfaces of the magnetic layer, wherein side surfaces of the heat radiation coating layer extended perpendicularly along the side surfaces of the magnetic layer from the upper surface to a bottom of the magnetic layer, and side surfaces of the heat radiation coating layer and the bottom of the magnetic layer directly contact the coil part.

10. The wireless power charging device of claim 9, wherein the heat radiation coating layer extends to an upper surface of the coil part.

11. The wireless power charging device of claim 10, wherein the heat radiation coating layer is directly formed on the upper surface of the coil part.

12. The wireless power charging device of claim 9, wherein the heat radiation coating layer comprises graphene.

13. The wireless power charging device of claim 9, wherein the heat radiation coating layer is directly formed on the surface of the magnetic layer.

14. The wireless power charging device of claim 9, wherein the heat radiation coating layer is disposed directly on top of a portion of the coil part and directly on top of a portion of the magnetic layer, wherein a width of the heat radiation coating layer exceeds a width of the magnetic layer and the width of the heat radiation coating layer equals a width of the coil part.

15. A sheet configured to shield a battery against electromagnetic waves, comprising:
   a magnetic layer configured to generate heat and formed as one of an integral layer and crushed into multiple pieces; and
   a heat radiation coating layer configured to radiate the heat from the magnetic layer and directly cover a portion of or an entire upper surface of the magnetic layer,
   wherein the heat radiation coating layer extends to side surfaces of the magnetic layer, and wherein side surfaces of the heat radiation coating layer extend perpendicularly along the side surfaces of the magnetic layer from the upper surface to a bottom of the magnetic layer, and side surfaces of the heat radiation coating layer and the bottom of the magnetic layer directly contact a coil part.

16. The sheet of claim 15, wherein an adhesive layer is interposed between the magnetic layers to adhere between the magnetic layers and to interlayer insulation between the magnetic layers.

17. The sheet of claim 15, wherein the heat radiation coating layer covering at least the portion of or the entire upper surface of the magnetic layer is thicker than a portion of the heat radiation coating layer covering the side surfaces of the magnetic layer.

18. The sheet of claim 15, wherein the heat radiation coating layer covering at least the portion of or the entire upper surface of the magnetic layer is thinner than a portion of the heat radiation coating layer covering the side surfaces of the magnetic layer.

* * * * *